Figure 1:
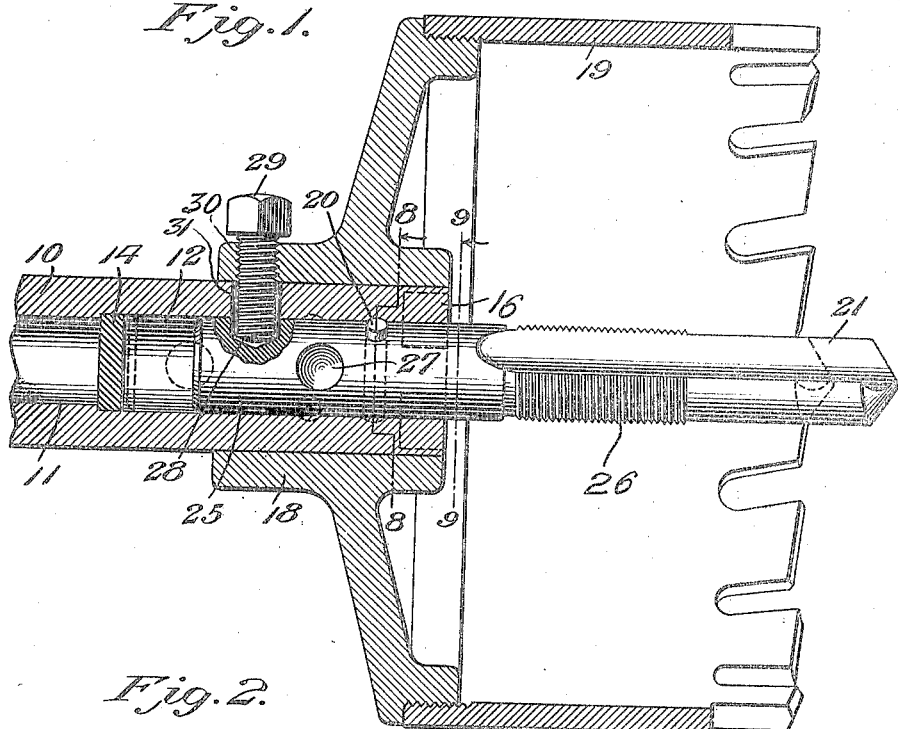

Jan. 9, 1923.

P. MUELLER.
SHELL CUTTER AND DRILL FOR DRILLING MACHINES.
FILED AUG. 27, 1919.

1,441,994.

2 SHEETS—SHEET 1.

Inventor
Philip Mueller
By *Meyers Cushman &c.*
Attorneys

Jan. 9, 1923.
P. MUELLER.
SHELL CUTTER AND DRILL FOR DRILLING MACHINES.
FILED AUG. 27, 1919.
1,441,994.
2 SHEETS—SHEET 2.
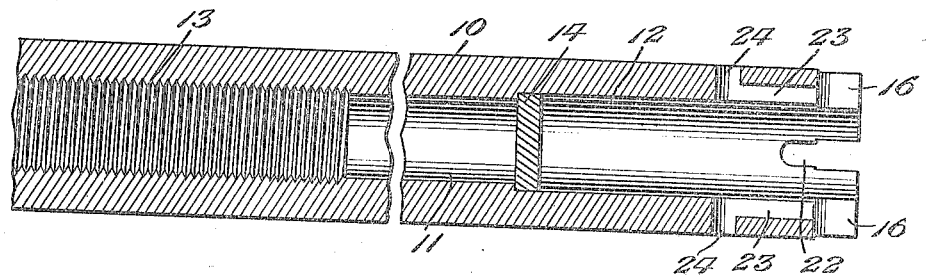
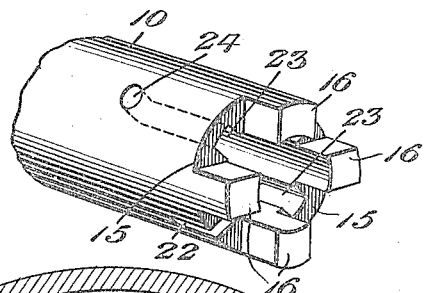
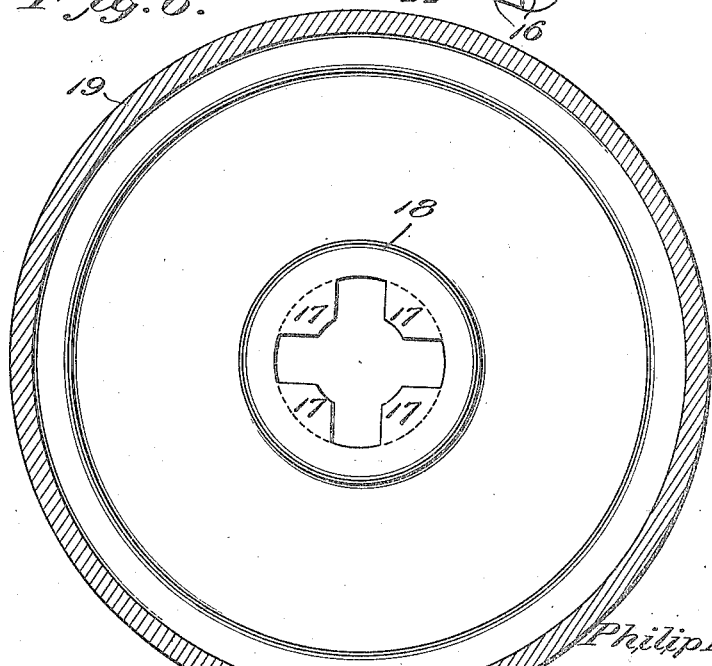
Inventor
Philip Mueller
by Meyers Cushman & Rea
Attorneys Patented Jan. 9, 1923.

1,441,994

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

SHELL CUTTER AND DRILL FOR DRILLING MACHINES.

Application filed August 27, 1919. Serial No. 320,291.

*To all whom it may concern:*

Be it known that I, PHILIP MUELLER, a citizen of the United States, residing at Decatur, in the county of Macon and State of Illinois, have invented new and useful Improvements in Shell Cutters and Drills for Drilling Machines, of which the following is a specification.

This invention relates to drilling or tapping machines of the type wherein a circular shell cutter connected to a boring bar or spindle is employed to cut a circular piece from the wall of the main, the opening in the main having substantially the same diameter as that of the branch pipe which is to be connected thereto. A pilot drill is employed in conjunction with the shell cutter for the purpose of centering and steadying the latter, and this pilot drill may have external threads which, when the cutter is advanced into the main, form complementary threads in the periphery of the small hole made by the pilot drill therein so that when the boring bar is withdrawn after completion of the boring operation the circular piece cut from the main is carried by the drill and is moved with the cutter from the main.

The present invention has as its general purpose to provide improved means for detachably securing a shell cutter and pilot drill to the boring bar or cutter spindle.

More specifically, the present invention has as its objects to provide improved means for securing the cutter and pilot drill to the boring bar whereby different sizes of shell cutters may be interchangeably connected to the boring bar of the tapping machine to cut different sizes of openings in the mains and pipes; to provide means which will permit of a longitudinal adjustment of the pilot drill relative to the boring bar so that the distance which the pilot drill projects beyond the cutting edges of the shell cutters may be varied and this same pilot drill may be used in conjunction with shell cutters of different lengths, and to provide a connection between the boring bar, shell cutter and drill which, while permitting of the desired adjustability, will be able to withstand torsional strains placed upon it during the boring operation, and which is capable of being easily disengaged.

In the drawings herewith I have illustrated one embodiment of my invention, but it is to be understood that the present disclosure is illustrative only of my invention and is not restrictive thereof.

In said drawings:—

Figure 2:
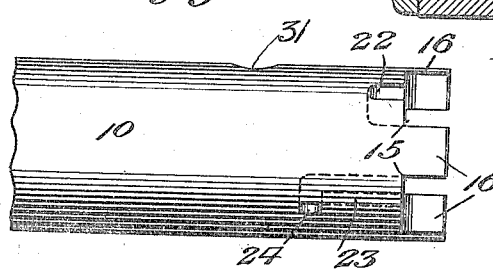
Figure 3:
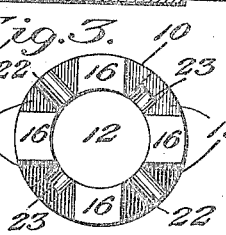
Figure 7:
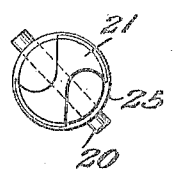
Figure 8:
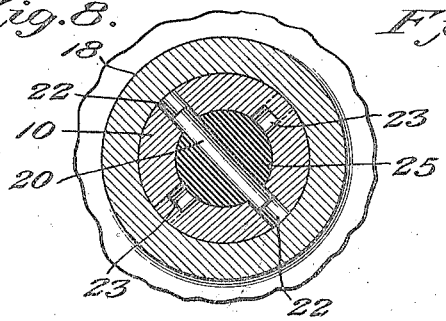
Figure 9:
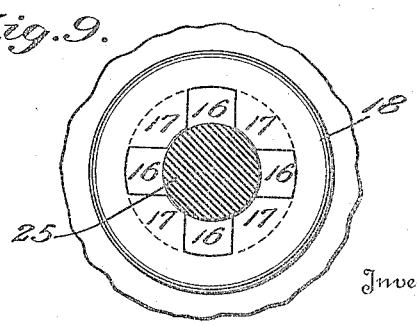

Figure 1 is a longitudinal sectional view through the cutter end of a boring bar and the shell cutter secured thereto, the pilot drill connected to the boring bar being shown in elevation, Figure 2 is a side elevational view of the cutter end of the boring bar, Figure 3 is an end view of the boring bar, Figure 4 is a longitudinal sectional view of the cutter end of the boring bar, Figure 5 is a perspective view thereof, Figure 6 is a sectional view taken on a plane passing through the circular portion of the shell cutter, Figure 7 is an end view of the pilot drill, Figure 8 is a sectional view taken on line 8—8 of Figure 1, Figure 9 is a sectional view through the pilot drill taken on line 9—9 of Figure 1.

In the drawings, wherein like numerals represent like parts in the several views, 10 designates the boring bar which in the present instance has a through opening 11, the opening being counterbored at its inner end, as at 12, to form a drill receiving socket, and the opening at its other end being threaded as at 13. The thread 13 is adapted to be engaged by the complementary thread of a feed screw (not shown) which feed screw is employed, as will be readily understood by those familiar with this art, for feeding the bar, together with the cutter carried thereby, longitudinally toward and from the main operated upon. The body portion of the tapping machine, the driving means for rotating the boring bar, and the means for feeding the bar longitudinally are not shown in the drawings, as they form no part of the present invention. Within the enlarged bore 12 and seated against the shoulder at the inner end therof is a plug 14 which prevents escape of fluid through the opening 11 of the boring bar.

The inner end of the boring bar is provided with a plurality of notches 15 which form intervening projections 16. The notches in the present illustrative disclosure are shown as being somewhat V-shaped in cross section and are four in number, but it is to be understood that the shape and number of these notches may be varied as desired. The notches 15 receive internal lugs 17 on the hub or sleeve 18 of a shell cutter 19. The lugs 17 are similar in size, cross sectional configuration and position to the notches 15 so as to engage therein and snugly fit between the projections 16 of the boring bar.

In the walls of the boring bar or cutter spindle 10 are a plurality of recesses extending longitudinally and inwardly from the bases or inner walls of the notches 15 and these recesses are adapted to receive a pair of diametrically disposed lugs or projections 20 on the shank of the pilot drill 21. In the present instance, two pairs of recesses are shown, the recesses of each pair being diametrically disposed. One pair of these recesses comprises diametrically disposed slots or depressions 22 extending only a short distance beyond the base of the lug-receiving notches 15 and these slots may be cut entirely through the wall of the boring bar as shown. The other pair of recesses comprises longitudinal grooves 23 located in the internal wall of the boring bar and terminating at their inner ends in holes 24. The holes 24 are provided to expedite the machining of the grooves 23 in that they permit the chips to clear from the tool forming the grooves. The grooves 23 are placed at right angles to the slots 22 and extend beyond the bases of the lug-receiving notches 15 a greater distance than do the slots 22. The recesses 23 are in the form of grooves rather than through slots for the reason that it is not desired to unduly weaken the wall of the boring bar.

The pilot drill 21 has a shank 25 adapted to snugly fit within the enlarged bore 12 of the boring bar. In the present instance, the lugs 20, hertofore referred to, are formed by a pin which extends diametrically through the shank, but it is to be understood that these lugs may be formed upon the shank in any suitable manner and if desired they may be integral therewith. The length of the pin 20 is substantially equal to the diametrical distance between the opposed inner walls of the grooves 23 so that these grooves may receive the pin.

The numeral 26 designates a screw thread upon the pilot drill, which screw thread forms a complementary thread in the piece cut from the pipe so that this piece will be held by the threads and within the shell cutter when the cutter is withdrawn from the pipe after completion of the boring operation.

The shank 25 of the pilot drill has a first depression 27 and a second depression 28. These depressions are disposed at an angle of 90 degrees to each other and the distance between the centers of these depressions is equal to the difference between the lengths of the slots 22 and grooves 23. The shell cutter 19 and the pilot drill 21 are secured against longitudinal movement to the cutter shaft by a set screw 29 which extends through a threaded opening 30 in the hub 18, a hole 31 (preferably unthreaded) in the wall of the boring bar and engages at its inner end in that depression 27 or 28 of the pilot drill which is in registry with the opening 31.

In assembling the pilot drill and shell cutter upon the end of the boring bar, the shank 25 of the pilot drill is first inserted in the enlarged bore 12 with the lugs 20 engaging in slots 22 or the grooves 23. The hub 18 of the shell cutter is then slipped about the cutter shaft and moved into position where the lugs 17 engage in the notches 15 of the boring bar. The set screw 29 is then turned to advance the inner end of the screw through the opening 31 and into the depression 27 or 28 which is in registry therewith. It is understood shell cutters of greater diameters are longer than those of small diameter. In the event that a shell cutter of small size is employed, the lugs 20 of the pilot drill would be brought into engagement with the grooves 23 and the depression 27 would be in registry with the opening 31 so as to receive the inner end of the screw 29. In this position, the pilot drill would project the proper distance beyond the cutting edge of the shell cutter. Should a shell cutter of larger size be employed, the set screw 29 would be withdrawn from the depression 27 and opening 31, the shell cutter would be removed, and the pilot drill would be withdrawn until the lugs 20 cleared the outer ends of the projections 16 whereupon the pilot drill would be given a quarter of a turn to bring the lugs 20 into alinement with the slots 22. The pilot drill would then be pushed inwardly of the boring bar until the lugs 20 engaged against the inner ends of the slots and in this position the depression 28 would be in registry with the opening 31 of the boring bar so as to receive the inner end of the said screw 29. It will thus be seen that the pilot drill may be readily adjusted to project the proper distance beyond the cutting edge of the shell cutter with which it is to be used in conjunction and this adjustment may be quickly accomplished. The engagement of the lugs 17 of the shell cutter within the notches 15 of the boring bar prevents relative rotation between the boring bar and shell cutter and at the same time the connection is such that the boring bar is able to withstand any torsional strain exerted upon it during the boring operation.

It will further be noted that the lugs 20 of the pilot drill have several very important functions. First, the lugs 20 limit the inward movement of the pilot drill within the slots 22 or grooves 23; secondly, they prevent the pilot drill from rotating within the hollow cutter spindle, and, thirdly they automatically bring either depression 27 or 28 into the correct position to register with the opening 31 in the cutter spindle.

It is, of course, understood that my invention is susceptible to the various changes and modifications which would fall within the spirit of the invention without departing from the scope of the following claims:

What I claim is:—

1. In combination, a boring bar having notches at one end, a shell cutter about said boring bar and having lugs engaging within said notches of said boring bar to prevent relative rotary movement between the bar and shell cutter, a pilot drill engaging within a bore in said boring bar, a plurality of recesses extending inwardly of said bar from the inner walls of said notches, said recesses being of different lengths, and a projection on said drill adapted to engage against the inner walls of said recesses to bring the drill into any one of a number of predetermined adjusted positions.

2. In combination, a boring bar having notches at one end, a shell cutter having a hub portion encircling said boring bar, said hub portion having internal lugs of like configuration as said notches and engaging therein, a pilot drill engaging within a bore in said bar, a plurality of angularly spaced recesses in said bar extending inwardly from the inner walls of said notches, said recesses being of different lengths, a projection on said drill adapted to engage against the end walls of said recesses to bring the drill into any one of a number of predetermined adjusted positions, the shank of said drill having a plurality of depressions spaced apart similarly to the inner ends of said recesses, and a set screw extending through openings in the hub portion of said cutter and said boring bar and engaging at its inner end in the depression which is in registry with said openings.

In testimony whereof I have hereunto set my hand.

PHILIP MUELLER.